United States Patent [19] [11] 4,419,464
Williams et al. [45] Dec. 6, 1983

[54] ERASABLE INK FOR BALL POINT PENS

[75] Inventors: Raymond S. Williams, Boulder City, Nev.; Paul C. Fisher, 711 Yucca St., Boulder City, Nev. 89005

[73] Assignee: Paul C. Fisher, Boulder City, Nev.

[21] Appl. No.: 402,830

[22] Filed: Jul. 29, 1982

Related U.S. Application Data

[63] Continuation of Ser. No. 320,443, Nov. 12, 1981, Pat. No. 4,367,966.

[51] Int. Cl.³ .................. C09D 11/18; C08K 5/05; C08K 5/06
[52] U.S. Cl. .................. 523/161; 524/169; 524/377; 524/384; 524/473
[58] Field of Search ............. 523/161; 524/473, 169, 524/377, 384

[56] References Cited

U.S. PATENT DOCUMENTS

| | | | |
|---|---|---|---|
| 3,728,299 | 4/1973 | Schramm | 524/473 |
| 3,875,105 | 4/1975 | Daugherty et al. | 523/161 |
| 3,930,794 | 1/1976 | Birke et al. | 8/614 |
| 3,950,185 | 4/1976 | Toyama et al. | 252/171 |
| 3,972,975 | 8/1976 | Noda | 264/275 |

Primary Examiner—Melvyn I. Marquis
Assistant Examiner—Herbert J. Lilling
Attorney, Agent, or Firm—Edward J. Quirk

[57] ABSTRACT

An erasable ink for use in a ball point pen, particularly in a pressurized cartridge, is a fluid comprising at least 10% w of polyvinyl acetate or a copolymer of ethylene and vinyl acetate, and at least 10% w trichloroethylene. The ink preferably also contains at least 5% w of a solvent boiling in the range of 180°–250° C., a plasticizer boiling above 270° C., a colorant, and a tackifier.

9 Claims, No Drawings

ERASABLE INK FOR BALL POINT PENS

This is a continuation of application Ser. No. 06/320,443, filed Nov. 12, 1981 now U.S. Pat. No. 4,367,966.

BACKGROUND OF THE INVENTION

This invention relates to an ink for use in ball point pens, and particularly in pressurized ball point pens, which is completely erasable for a period of several hours after application. The ink is safe to manufacture and store, and does not separate on standing.

Erasable ball point inks have been known for several years. Early efforts were directed to "liquid lead" pens using media such as a graphite suspension in a polyester resin as described in Cofield et al., U.S. Pat. No. 2,715,388. More recent approaches involve the use of a rubber or rubber-like vehicle dissolved in a volatile solvent which evaporates as the ink is spread upon paper. One of the earlier of such approaches is disclosed in Daugherty et al., U.S. Pat. No. 3,875,105.

In the Daugherty patent, a polyvinyl methyl ether resin was mixed with a volatilizing agent (toluene) and a high-boiling solvent (glycol phenyl ethers) for viscosity adjustment, as well as various other components. The mixture produced a writing medium comprising a heterogeneous liquid having a continuous phase containing the resin and volatile solvent and a discontinuous phase containing other materials of the formulation. Upon dispensing of the medium, the solvent volatilizes, and the polyvinyl methyl ether precipitates and captures colorant particles from the discontinuous phase.

A very similar system is described in Muller et al., U.S. Pat. No. 4,097,290. The Muller patent discloses the use of milled natural rubber (or its synthetic equivalent, cis-1,4 polyisoprene), or an epichlorohydrin elastomer, in a very low-boiling solvent such as petroleum naphtha or a volatile aromatic solvent. A dual solvent system is also disclosed.

The writing media disclosed in both the Muller and Daugherty patents appear not to be entirely homogeneous liquids, and tend to separate upon standing. When a pen containing these inks is not used for a period of time, a clear liquid drop appears at the pen tip, and must be wiped off prior to use. As a result of the phase separation that occurs at the ball, the first few characters written with the pen are faint and/or discontinuous. Commercial embodiments of some pens containing these inks carry a recommendation that the point be wiped with a tissue after long periods of non-use.

Furthermore, erasable inks of the prior art contain volatile flammable solvents. Since the ink manufacturing process always involves a lengthy mixing operation and frequently involves heating, the risk of fire or explosion must be considered. In addition, storage of a very large number of pens or large quantities of ink in a warehouse could create additional danger in the event of a fire.

It has been found in accordance with the present invention that an erasable ballpoint ink which is less flammable and less dangerous to handle than conventional inks and which does not separate, or "weep", can be produced from a particular combination of elastomer and low-boiling solvent. More particularly, it has been found that polyvinyl acetate or ethylene/vinyl acetate copolymers, when used in combination with trichloroethylene and other conventional ink components, provides an erasable ink which is less likely to smear and is less flammable than conventional inks, and is fully erasable for several hours; additionally, it produces an excellent trace immediately upon commencement of writing even if the pen has not been used for some time. The ink is removable with a soft pencil eraser.

Accordingly, it is an object of the invention to provide a ball point writing medium which is easily erased, and which consists essentially of a substantially homogeneous liquid which does not separate on standing. It is a further object of the invention to provide an ink which is safe and less flammable. These and other objects of the invention are effected by the compositions of the invention, specific embodiments of which are disclosed herein.

SUMMARY OF THE INVENTION

The invention contemplates an ink for use in ball point pens which comprises from about 10% to about 25% w of an elastomer selected from the group consisting of polyvinyl acetate and copolymers of ethylene and vinyl actetate, and from about 10% to about 40% w of trichloroethylene. Preferred embodiments also contain at least one additional solvent for the elastomer having a boiling point of at least about 180° C., and may contain a high-boiling solvent or plasticizer.

DETAILED DESCRIPTION OF A PREFERRED EMBODIMENT

The writing medium of the invention, in a preferred embodiment, contains an elastomer, a low-boiling solvent, a medium-boiling solvent, a high-boiling solvent or plasticizer, a colorant, a tackifier, a lubricant, and a wetting agent. Many of these components are conventionally used in ball point inks, and may be replaced or substituted with equivalent components. The combination of the particular elastomer and low boiling solvent is believed novel, and when used in combination with other particular materials as set forth herein, provides an outstanding erasable writing medium.

The elastomer used in inks of the invention is either polyvinyl acetate or a copolymer of ethylene and vinyl acetate, or may be a mixture thereof. Polyvinyl acetate resins are thermoplastic resins which are solid at ambient conditions. These materials are commercially available, for example under the trademark VINAC resins from Airco Chemical. Polymer molecular weights may range from about 30,000 to about 700,000, with the higher range (e.g., 200,000–700,000) being preferred. These compounds are used in adhesives, lacquers, and have been used as binders in printer's inks.

Suitable ethylene/vinyl acetate copolymers preferably contain more than about 30% vinyl acetate. These materials are commercially available from DuPont Company, Plastic Products & Resins Department, under the trademark "ELVAX". These materials are known to be useful for adhesives, sealants, paints, and inks. The elastomer is used in the ink of the invention in the amount of from about 10% to about 25% by weight of the final composition. The copolymer is a preferred elastomer, in that it seems to promote better ball adhesion and paper adhesion, and is more compatible with the other components than polyvinyl acetate.

The main function of the low-boiling solvent, trichloroethylene, is to assist in controlling the flowability and viscosity of the writing medium, and to volatilize when the medium is applied. Trichloroethylene has the chemical formula $CHCl=CCl_2$ and is a widely commercially available solvent and diluent. While other low-boiling solvents for the elastomer, such as benzene or toluene, may be used, trichloroethylene is significantly superior in formulations of the invention because of its particular solvent ability and non-flammable nature. Trichloroethylene is used in amounts of about 10% to about 40% by weight of the ink composition.

A medium-boiling solvent is preferably used in the amount of from about 5% to about 32% by weight of the ink composition. The medium-boiling solvent need not be a direct solvent for the elastomer. It must however be a solvent that can be homogenously blended with the other active elastomer solvents and must be compatible with the system as a whole. The medium boiling solvent should preferably boil in the range of from about 180° C. to about 250° C. Suitable medium-boiling solvents are benzyl alcohol and dipropylene glycol, which have boiling points of 206° C. and 233° C., respectively. The medium-boiling solvents are used to control the flowability and viscosity of the liquid.

A high-boiling solvent, which may be referred to as a plasticizer, is used in the amount of from about 5%w to about 25%w. Any plasticizer for the elastomers may be used. Suitable plasticizers are an intermediate molecular weight polyester marketed under the trademark PARAPLEX G-50 by Rohm and Haas Company, and a mixture of N-ethyl-ortho-and para-toluenesulfonamides marketed under the name SANTICIZER 8 plasticizer. These components have boiling points of 300+° C. and 340° C., respectively. There are many commercially available plasticizers for vinyl acetate elastomers, and it is well within the ability of one skilled in the art to select an appropriate component. The high-boiling solvent has a boiling point of at least 270° C., preferably at least 300° C.

A second high boiling point solvent optionally used to improve lubrication and continuity of writing quality is used in amounts of 0-25%w and may be any white mineral oil having an initial boiling point of at least 270° C., preferably at least 300° C. A suitable mineral oil is marketed under the tradename KAYDOL by Witco Chemical Co. and has an initial boiling point of 349° C.

Colorants used in inks of the invention are pigments which can form a stable dispersion in the writing medium. Various known colorants are commercially available and functional in inks of the invention. CYANBLUE 55-3750, CYANADUR Violet 55-8500, and Cyanamid Methyl Violet 55-2919, all available from American Cyanamid Co., Boundbrook, N.J., are excellent pigments for use in the invention. The pigments are generally used in the amount of about 10% to about 20%w.

A tackifier may be used to increase uniform adhesion of the ink to the paper. A suitable tackifier is a primary monohydric alcohol sold by Hercules Chemical Co. under the name ABITOL. "Abitol" is a mixture of tetra, di, and dihydro abietyl alcohols. The tackifying component may be used in amounts of about 3% to about 14%w.

A wetting agent such as stearic acid may also be used in inks of the invention in of 0-4%w. A solid binder may also be added in the amount of 0-2%w; fumed (sub-microscopic) silica such as is marketed under the trade name Cabosil M5 by Cabot Corp., Boston, Mass., is acceptable.

Examples of satisfactory inks formulated in accordance with the invention are as follows.

EXAMPLE I

| Component | Amount, % w. |
|---|---|
| Ethylene/vinyl acetate copolymer (33% VAc) | 14.5% |
| Paraplex G50 | 19.25% |
| Mineral Oil | 19.5% |
| Abitol | 3.5% |
| Cyanblue BNF 55-3750 | 9.5% |
| Cyanadur Violet 55-8500 | 1.75% |
| Cabosil M5 | 1.5% |
| Trichloroethylene | 30.5% |
| | 100.0% |

EXAMPLE II

| Component | Amount, % w. |
|---|---|
| Polyvinylacetate (mol. wt. 250,000) | 10.0% |
| DiPropylene Glycol | 32.0% |
| Cabosil M5 | 1.0% |
| Trichloroethylene | 39.0% |
| CyanBlue BNF 55-3750 | 18.0% |
| | 100.0% |

EXAMPLE III

| Component | Amount, % w. |
|---|---|
| Trichloroethylene | 37.0% |
| Benzyl alcohol | 10.0% |
| Polyvinyl Acetate (mol. wt. 625,000) | 11.5% |
| Santicizer 8 | 23.0% |
| Stearic Acid | 2.0% |
| CyanBlue BNF 55-3750 | 12.0% |
| Cyanamid Methyl Violet 55-2919 | 4.5% |
| | 100.0% |

EXAMPLE IV

| Component | Amount, % w. |
|---|---|
| Ethylene/vinyl acetate copolymer (40% VAc) | 21.0% |
| Paraplex G50 | 5.5% |
| Mineral Oil | 22.5% |
| Benzyl Alcohol | 5.5% |
| Abitol | 4.0% |
| Stearic acid | 2.0% |
| Cyanblue BNF 55-3750 | 11.5% |
| Cyanadur Violet 55-8500 | 2.5% |
| Trichloroethylene | 25.5% |
| | 100.0% |

The inks of the invention are manufactured as follows. Ingredients are added to a Lourdes closed blender type mixer in two sequences. All resins, medium- and high-boiling solvents, lubricants (wet & dry), the tackifier and the pigments are added as a first step. This combination is then mixed at medium to low speed until the pigments are wetted and dispersed. The temperature is then increased to 80°-95° C. and mixed at medium speed for one hour or until resins are solubilized and completely dispersed. The mixer is then cooled to 25°-30° C. The silica binder and volatile solvent are then added as the second step and are mixed for a period of 1 hour at slow speed. The ink is then transferred from the mixer to sealed containers.

The erasable ink disclosed herein is specifically formulated for use in a ball point writing instrument. Depending on the relative quantities of the various ingredients used, the ink may not possess sufficient flowability to migrate adequately through the narrow passageways around the ball of a conventional gravity-fed pen. The inks of the invention are especially adapted for use in pressurized cartridges of the type disclosed in Fisher et al., U.S. Pat. No. 3,425,779. The pressurized pen may be mechanically actuated but is preferably pressured with a gas such as air, nitrogen, carbon dioxide or other generally inert or non-reactive gas. Specific pressurization technology is well-known and forms no part of this invention, except that the ink formulations of the invention are particularly adapted to pressurized cartridges because of their high viscosity.

Inks of the invention may also be formulated with other additives such as corrosion inhibitors, stabilizers, preservatives, dispersing agents, parting compounds, and the like, and still be within the scope of the invention. Modifications of the formulation and substitutions of various specific components such as plasticizers, tackifiers, colorants, and the like will be obvious to those skilled in the art and are contemplated to be within the purview of the invention. Accordingly, the invention should not be considered limited by the specific embodiments disclosed herein, but rather should be limited only by the following claims.

I claim:

1. An erasable writing ink suitable for use in a ball point pen comprising at least 10% by weight of an elastomer selected from the group consisting of polyvinyl acetate, a copolymer of ethylene and vinyl acetate, and mixtures thereof, from about 10% to about 40% by weight of trichloroethylene, and an effective amount of a colorant.

2. The ink of claim 1 which contains from about 10% to about 25% by weight of elastomer.

3. The ink of claim 1 also comprising at least 5%w of a solvent having a boiling point of at least about 180° C.

4. The ink of claims 1 or 3 also comprising at least about 5%w of a second solvent having a boiling point of at least about 270° C.

5. The ink of claim 3 wherein the solvent is benzyl alcohol or dipropylene glycol.

6. The ink of claim 4 wherein the second solvent is a polyester plasticizer or toluene sulfonamide.

7. The ink of claim 1 also comprising from 0-25%w of a white mineral oil having an initial boiling point of at least 270° C.

8. The ink of claim 1 comprising from about 10% to about 25%w elastomer, about 10% to about 40%w trichloroethylene, about 5% to about 32%w of a solvent boiling in the range of about 180°-250° C., about 0% to about 25%w of a solvent having a boiling point of at least 270° C., and at least about 10%w of a colorant.

9. The ink of claim 8 also comprising at least about 3%w of a tackifying agent.

* * * * *